United States Patent
deBoer et al.

(10) Patent No.: US 7,406,033 B2
(45) Date of Patent: Jul. 29, 2008

(54) METHODS, DEVICES AND SOFTWARE FOR COMBINING PROTECTION PATHS ACROSS A COMMUNICATIONS NETWORK

(75) Inventors: Evert E. deBoer, Nepean (CA); James A. Shields, Antrim (GB); Rick R. Wedge, Richmond (CA); Peter J. Ashwood-Smith, Hull (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 881 days.

(21) Appl. No.: 10/084,201

(22) Filed: Feb. 28, 2002

(65) Prior Publication Data

US 2003/0161304 A1 Aug. 28, 2003

(51) Int. Cl.
H04J 3/14 (2006.01)

(52) U.S. Cl. .............. 370/218; 370/225; 370/228
(58) Field of Classification Search ........... 370/216, 370/217, 218, 221, 222, 223, 224, 225, 226, 370/227, 228, 254, 255
See application file for complete search history.

(56) References Cited

U.S. PATENT DOCUMENTS

| 5,856,981 | A  | * | 1/1999  | Voelker ................. 714/712 |
| 5,999,103 | A  | * | 12/1999 | Croslin ................. 340/825.01 |
| 6,147,966 | A  | * | 11/2000 | Johnson et al. ........... 370/221 |
| 6,154,296 | A  | * | 11/2000 | Elahmadi et al. .......... 398/83 |
| 6,314,092 | B1 | * | 11/2001 | Reeve ................... 370/351 |
| 6,331,905 | B1 | * | 12/2001 | Ellinas et al. ............ 398/2 |
| 6,421,349 | B1 | * | 7/2002  | Grover .................. 370/408 |
| 6,658,457 | B2 | * | 12/2003 | Nishikawa et al. ......... 709/206 |
| 6,744,727 | B2 | * | 6/2004  | Liu et al. ............... 370/228 |
| 6,829,216 | B1 | * | 12/2004 | Nakata .................. 370/228 |
| 6,850,997 | B1 | * | 2/2005  | Rooney et al. ............ 710/38 |
| 6,856,592 | B2 | * | 2/2005  | Grover et al. ............ 370/216 |
| 6,895,441 | B1 | * | 5/2005  | Shabtay et al. ........... 709/238 |
| 6,963,995 | B2 | * | 11/2005 | Fee ..................... 714/4 |
| 6,978,394 | B1 | * | 12/2005 | Charny et al. ............ 714/4 |
| 7,020,087 | B2 | * | 3/2006  | Steinberg et al. ......... 370/238 |
| 7,093,160 | B2 | * | 8/2006  | Lau et al. ............... 714/11 |
| 2001/0032271 | A1 |   | 10/2001 | Allan .................... 709/239 |
| 2004/0062197 | A1 | * | 4/2004  | Klink .................... 370/222 |

OTHER PUBLICATIONS

Awduche, D., Malcolm, J., Agogbua, J., O'Dell, M. and McManus, J., RFC 2702: Requirements for Traffic Engineering Over MPLS, 1999.

Rosen, E., Viswanathan, A., and Callon, R. RFC 3031: Multiprotocol Label Switching Architecture, 2001.

Rosen, E., Tappan, D., Fedorkow, G., Rekhter, Y., Farinacci, D., Li, T., and Conta, A., RFC 3032: MPLS Label Stack Encoding, 2001.

(Continued)

Primary Examiner—Chi H. Pham
Assistant Examiner—Soon-Dong D Hyun
(74) Attorney, Agent, or Firm—Anderson Gorecki & Manaras (57) ABSTRACT

In a mesh communications network, in which working and protection paths may be established, channels used to carry protection traffic between nodes are shared across multiple protection paths. Channels need only be shared if sharing does not adversely impact network usage. If working and protection paths become susceptible to single points of failure, channels need not be shared.

12 Claims, 5 Drawing Sheets

OTHER PUBLICATIONS

Suzuki, M., RFC 3033: The Assignment of the Information Field and Protocol Identifier in the Q. 2941 Generic Identifier and Q.2957 User-to-User Signaling for the Internet Protocol, 2001.

Conta, A., Doolan, P., and Malis, A., RFC 3034: Use of Label Switching on Frame Relay Networks Specification, 2001.

Davie, B., Lawrence, J., McCloghrie, K., Rosen, E., Swallow, G., Rekhter, Y., and Doolan, P., RFC 3035: MPLS and LDP and ATM VC Switching, 2001.

Andersson, L., Doolan, P., Feldman, N., Fredette, A., and Thomas, B., RFC 3036: LDP Specification, 2001.

Thomas, B., and Gray, E., RFC 3037: LDP Applicability, 2001.

Nagami, K., Katsube, Y., Demizu, N., Esaki, H., and Doolan, P., RFC 3038: VCID Notification over ATM link for LDP, 2001.

Ohba, Y., Katsube, Y., Rosen, E., and Doolan, P., RFC 3063: MPLS Loop Prevention Mechanism, 2001.

Rekhter, Y., and Rosen, E., RFC 3107: Carrying Label Information in BGP-4, 2001.

Berstein, Greg et al., "Framework for GPMLS-based Control of SDH/SONET Networks", CCAMP Internet Draft, <draft-bms-optical-sdhsonet-mpls-control-frmwrk-01.txt>, Jul. 2001.

Owens, Ken et al., "Extensions to RSVP-TE for MPLS Path Protection" IETF Internet Draft, <draft-chang-mpls-rsvpte-path-protection-ext-02.txt>, Jul. 2001.

Sharma, Vishal et al., "Framework for MPLS based Recovery" MPLS Working Group Information Track, <draft-ietf-mpls-recovery-frmwrk-03.txt>, Jul. 2001.

Owens, Ken et al., "A Path Protection/Restoration mechanism for MPLS Networks" IETF Internet Draft, <draft-chang-mpls-path-protection-03.txt>, Jul. 2001.

Awduche, Daniel O. et al, "RSVP-TE Extensions to RSVP for LSP Tunnels", Network Working Group Internet Draft, <draft-ietf-mpls-rsvp-lsp-tunnel-09.txt>, Aug. 2001.

* cited by examiner

METHODS, DEVICES AND SOFTWARE FOR COMBINING PROTECTION PATHS ACROSS A COMMUNICATIONS NETWORK

FIELD OF THE INVENTION

The present invention relates to communications networking protocols, and more particularly to a method, device and software for establishing protection paths that share bandwidth across a meshed communications network.

BACKGROUND OF THE INVENTION

The need to provide reliability between communications nodes on networks has been known and understood for some time. As such, network designs often provide for protection paths across such networks in the event of failures.

For example, synchronous optical networks ("SONET") and asynchronous transfer mode ("ATM") networks include protection switching used to provide 1+1, 1:1, 1:n, or m:n redundancy for provisioned paths across SONET and ATM networks. In the event of a fault, exemplified by failed or degraded signal, traffic from a working path may be switched to a provisioned protection path, thereby limiting the effects of a fault.

In the past, existing protocols have required manual configuration of working and protection paths across the network. Network topologies were relatively simple, and configuration was straightforward. More recently conceived networks allow paths to be established dynamically, and automatically as required. This provides great flexibility in configuring the network to provide working and protection paths only as required.

However, provisioning network resources to effectively provide sufficient redundancy for protection switching without unnecessarily reserving network resources presents new challenges for network operators and architects. This is particularly so for modern mesh networks, in which each network node may have links to multiple adjacent nodes, and multiple paths between source and destination nodes exist.

Accordingly, there is a need for new network protocols, methods and devices that make efficient use of network resources while allowing protection switching.

SUMMARY OF THE INVENTION

In accordance with the present invention, bandwidth used to carry protection traffic between nodes on a communications network is shared between multiple protection paths.

Advantageously, network resources between adjacent nodes need only be reserved once in the presence of multiple protection paths using links between the adjacent nodes.

Preferably, if working and protection paths would become susceptible to single points of failure as a result of shared protection bandwidth, bandwidth need not be shared.

In accordance with an aspect of the present invention a method at a first node within a mesh network includes combining first and second protection paths between the first node and a second node, wherein the first and second protection paths include first and second protection channels, respectively, between the first and second node. The method includes assessing if the first and second protection paths may be combined; releasing the first protection channel, and replacing the first protection channel with the second protection channel along the first protection path if the first and second protection paths may be combined.

In accordance with yet another aspect of the present invention there is provided a method in a mesh communications network in which a protection path across the network may be allocated using protection channels between adjacent nodes on the network. A protection channel extends between a first and a second node along a second protection path, protecting a second working path. The method includes, a. determining if a protection channel along a first protection path protecting a first working path, already exists between the first node and the second node. If the first working path and the second working path do not share a common point of failure, assigning the existing protection channel to the second path.

In accordance with yet a further aspect of the present invention there is provided a method of operating a node in a meshed network in which a first pair of source and destination nodes may communicate with each other by way of a first working path and a first protection path and a second pair of source and destination nodes may communicate with each by way of a second working path and a second protection path across the network. The method includes combining the first protection path and the second protection path between adjacent nodes on the network, if the combining does not result in communications between either of the first and second pairs of source and destination becoming susceptible to a common point of failure on the network.

In accordance with an aspect of the present invention there is provided a communications node within a mesh interconnected communications network. The node includes a processor operable to establish channels between adjacent nodes on the communications network, and is operable to establish first and second protection channels between adjacent nodes, along respective first and second protection paths across the network. The first and second protection channels for carrying traffic between the first and second nodes in the event of failure of associated working paths across the network. The processor assesses if the first and second protection paths may be combined. If so, it releases the first protection channel, and replaces it with the second protection channel along the first path.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
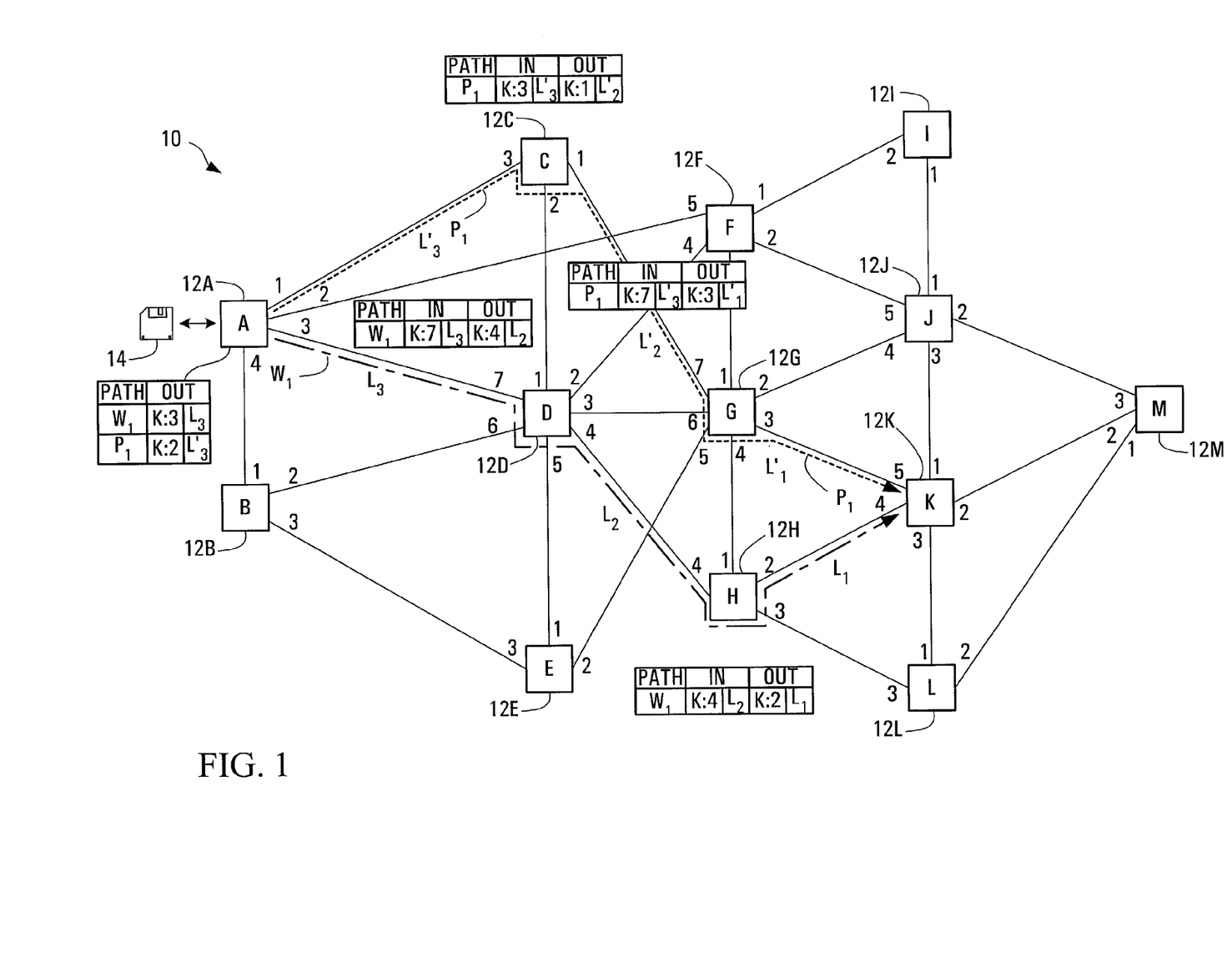
FIG. 1 illustrates a communications network, formed of a plurality of communications nodes exemplary of embodiments of the present invention.

FIG. 1 illustrates an exemplary communications network 10 including a plurality of communication network nodes 12a-12m (individually and collectively referred to as nodes 12, individually referred to as nodes A, B, C, . . . K). Each of nodes 12 is physically interconnected to one or more of the remaining nodes 12, by a physical link. The links may, for example, be fiber optic cables or the like. Network 10 is exemplary of a mesh connected network: nodes are interconnected to multiple neighboring nodes. Network 10 may be a single network, or may be a collection of interconnected sub-networks.

Each node 12 is a conventional communications node, such as an optical cross connect, a network router, or the like. Each node is controlled by a processor under software control, allowing the establishment of communication paths between pairs of nodes, and the exchange of data between nodes along these paths.

Paths may be established using known path establishment protocols modified to function in manners exemplary of the present invention and embodied in software at the nodes. Known path establishment protocols include multi-protocol label switched path (MPLS), in the case of IP compliant networks; multi-protocol lamda switched path (MPλS) (also referred to as generalized multi-protocol label switched path (GMPLS) switching), or G.ASON compliant networks, in the case of optical networks; ATM-PNNI in the case of ATM networks. Other path establishment protocols will be readily known to those of ordinary skill.

Network nodes 12 may further support other network protocols for the transport of data across network 10, such as, for example the internet protocol (IP), asynchronous transfer mode protocols (ATM), synchronous optical networking protocols (SONET), wavelength division multiplexing (WDM), or the like.

As will be appreciated, a control processor used to establish paths, control routing, cross-connects and the like may be physically separate from traffic carrying node. Optionally, control processors may be interconnected by a network separate from the traffic carrying links between nodes 12. For simplicity, example nodes 12 are illustrated and described as including both control and traffic carrying ability.

Established paths between pairs of source and destination nodes typically include individual traffic carrying channels established along links between adjacent nodes. A collection of channels across multiple links connects source to destination node, to establish the path. Channels, in this context may be reserved bandwidth on the links.

Once a path between a pair of source and destination nodes is established, data may be passed between source and destination nodes using one or more conventional networking protocols such as, for example, IP; ATM SONET, WDM or the like.

Depending on the networking protocol(s), channels between nodes may take various forms. For example, for a WDM network a channel may be a wavelength of light. For an ATM network, a channel may be virtual channel. For a SONET network, a channel may be a SONET tunnel.

Software including instructions that when executed by processors at each node may be loaded from a computer readable medium, such as medium 14. Exemplary software adapts nodes 12 to support necessary network protocols, and function in manners exemplary of embodiments of the present invention. The degree of modification to software embodying conventional protocols will vary depending on the nature of the path establishment protocol, and the data carrying protocol supported at each node. It is expected that such modification is within the skill of a person of ordinary skill in the art.

Exemplary of the present invention, paths across network 10 may be established in redundancy, with one protection path offering an alternate path for one or more working paths in the event of fault along the working path. That is: for any working path that is established between a pair of source and destination nodes, a protection path may also be established. The protection path may be used in the case of fault exemplified by a failure or degradation of the working path. Switching between protection and redundant paths may be effected in conventional ways understood by those of ordinary skill. Depending on the nature of the network, protection switching may, for example, be effected in accordance with ITU Recommendation I.610, I.630 for ATM; or G. 783 or G. 709 for SONET.

For illustration only, network 10 will be described as an MPLS compliant network, with each of nodes 12 supporting MPLS and further optionally supporting MPLS Traffic Engineering extensions, as for example detailed in the Internet Engineering Taskforce, Request For Comments (IETF RFCs) 2702, 3031, 3032, 3034, 3035, 3036, 3037, 3038, 3033, 3063, and 3107, and optionally proposed protection switching methods disclosed, for example, in IETF Draft, Ken Owens et al., Multi-Protocol Label Switching A Path Protection/Restoration Mechanism for MPLS Networks <draft-chang-mpls-path-protection-03.txt>, July 2001 and MPLS Working Group Vishal Sharma, et al. Framework for MPLS-based Recovery <draft-ietf-mpls-recovery-frmwrk-03.txt>, July 2001

In order to establish a working path across network 10, any protocol available for path establishment supported at nodes 12 may be used. For example, any path establishment mechanism forming part of MPLS (such as the MPLS label distribution protocol (LDP), or constrained routing LDP (CR-LDP)); may be supported at nodes 12.

Now, in a manner exemplary of an embodiment of the present invention, a source node, such as for example node A establishes a working path across network 10 in order to exchange traffic with a destination node. For purposes of illustration, node A may establish a working path with a destination node, for example node K.

In order to establish this working path, any suitable signaling protocol understood by nodes 12 may be used. For example, MPLS label distribution protocol may be supported at the nodes and may be used to establish the working path (A-K). As will be appreciated, the LDP may be used to establish label switched paths (LSPs) across network 10. LSPs may be established automatically by the network, or explicitly at the source node (referred to as explicitly routed label switched paths (ER-LSPs)).

Explicitly routed paths may be established by a source node, using information about the topology of the network known by the source node. Information about the topology of network 10, for example, may be stored in a database or data structure local to node A. This information about network 10 may be used to route the path. The information available to node A may be provided by conventional routing protocols, such as OSPF. Of course, information about the topology of network 10 need not be stored locally at node A, but instead may be stored remotely and retrieved as required.

Establishment of an exemplary path W1 (in this case an explicitly routed LSP) from node A to node K is illustrated in FIG. 1. So, for example, an ER-LSP used to establish the route may include identifiers of nodes D, H and K (e.g. ROUTE=D, H, K). Identifiers of nodes D, H, and K may take the form of network addresses for those nodes. In a conventional manner, the path establishment message may be passed from node A to nodes D, H and K. Once the path establishment message is received at node K, messages used in establishing labels at each of nodes D, H and K may be passed upstream. The labels, in turn, are used to identify MPLS messages to be carried on between adjacent nodes. For each label, a further corresponding traffic carrying channel may also be established between adjacent nodes.

That is, the port of the arriving path establishment message at node K may be associated with a label (L1) and passed in an upstream message from node K to node H. There, the outgoing port to node K may be stored in association with the established label. Another label (L2) may further be assigned to the incoming port connecting node H to node D. Label L2 and the incoming port may be stored at node H in association with the outgoing label L1 and port. As well, a message containing the incoming label L2 may be passed to upstream node D. There, the received label L2 and port may be stored as outgoing label and port. Again, the incoming port from node A may be assigned a further label L3, which is stored in association with the outgoing label and port at node D. The incoming label L3 is passed to node A. Corresponding cross-connects, routing table entries, and the like may also be established at each node to establish corresponding traffic channels between adjacent nodes to allow transport of traffic along the label switched path. Labels stored at nodes A, D, H, and K are illustrated in FIG. 1.

Now, in order to pass messages from node A to node D (and therefore node K) data need only be associated with label L3 at node A, and dispatched to the outgoing port. Similarly, traffic destined for node K may be passed on the associated traffic carrying channel between nodes A and D.

Additionally, the established path may be explicitly identified by a path identifier at source node A, using for example an LSP-ID label assigned at the source node. LSP-ID labels are for example detailed in Network Working Group Internet Draft, Daniel O. Awduche et al., RSVP-TE: Extensions to RSVP for LSP Tunnels <draft-ietf-mpls-rsvp-lsp-tunnel-09.txt>, July 2001.

This path identifier may be passed from source node A to destination node K, and then passed upstream and stored along the path, as individual channels across links are established. As well, an identifier of whether the established path is a working or protection path may also be stored at each of nodes A, D, H and K.

Once a working path between A and K is established, node A may further establish a protection path to carry traffic of the working path in the event of failure of the working path. The protection path may be pre-determined at the source node A to avoid overlap, and thereby shared resources, with the working path. This may, for example, be performed using Dijkstra's algorithm. Determination of the protection path at node A allows establishment of an explicit protection path. Again, this path may be a LSP and may be established using GMPLS, extended as required, or the like. The path label passed from node 12a may identify the path as a protection path for W1.

Preferably the protection path is established as a conventional 1+1 protection path for the working path W1. An example protection path P1 for working path W1 may be calculated as including nodes A, C, G and K. Example labels and path information stored at nodes A, C, G, K are also illustrated in FIG. 1.

In normal operation, to pass traffic from node A to K, traffic is associated with label L3 at node A, and passed over path W1 via port 3 to node K. In the presence of a fault, the fault may be signaled to source node A. This signaling may be done using higher level protocols, such as for example automatic protection switching mechanisms of SONET or ATM protocols. Alternatively, proposed GMPLS extensions may be used. Thereafter, traffic destined for node K may be passed along path P1, by way of port 2 and in association with label L3'. Intermediate nodes D and H (or C and G for P1) switch received labeled traffic in accordance with MPLS.

Figure 2A:
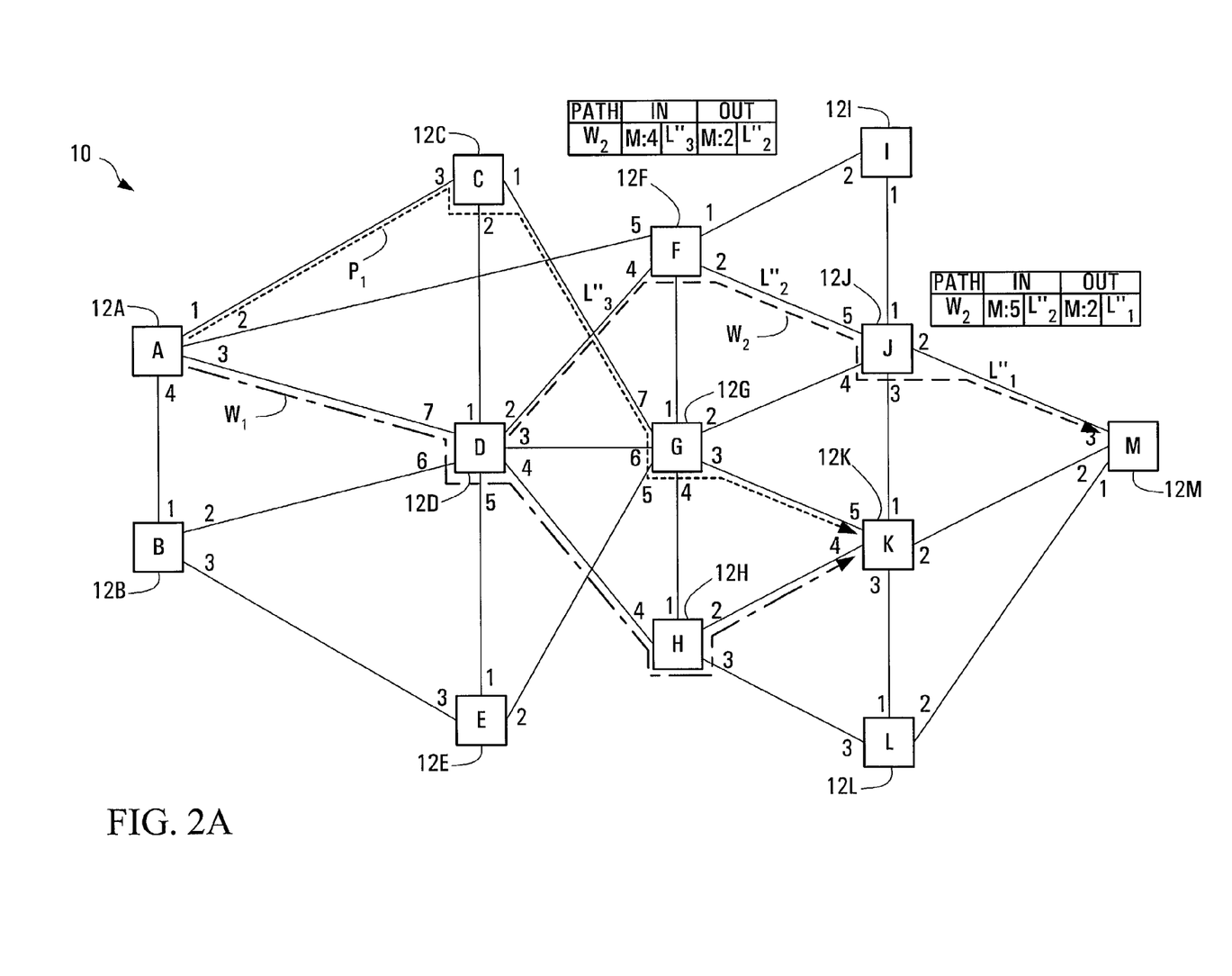
FIGS. 2A and 2B illustrate working and protection paths established between nodes of the network of FIG. 1.
Figure 2B:
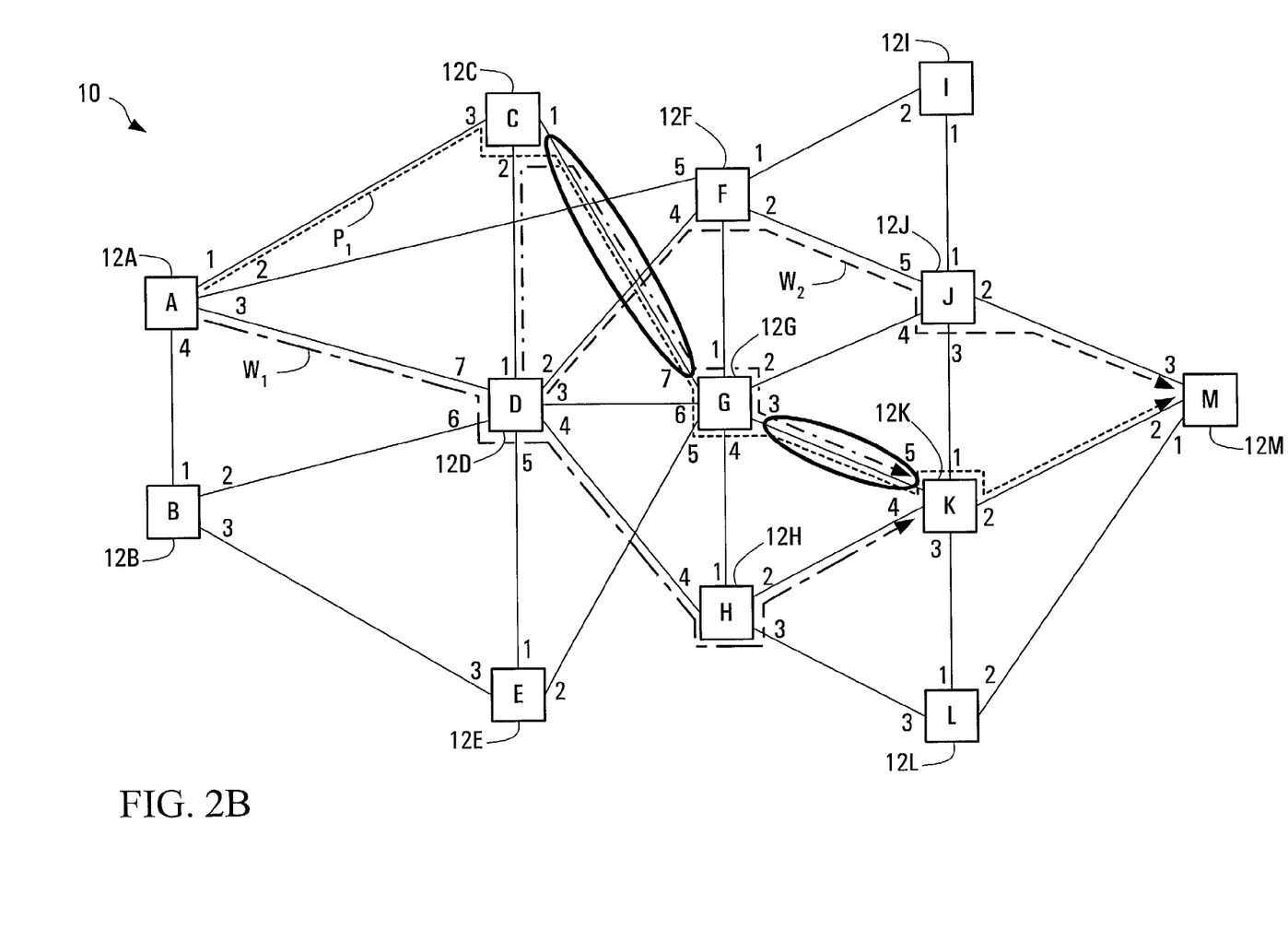
Figure 2C:
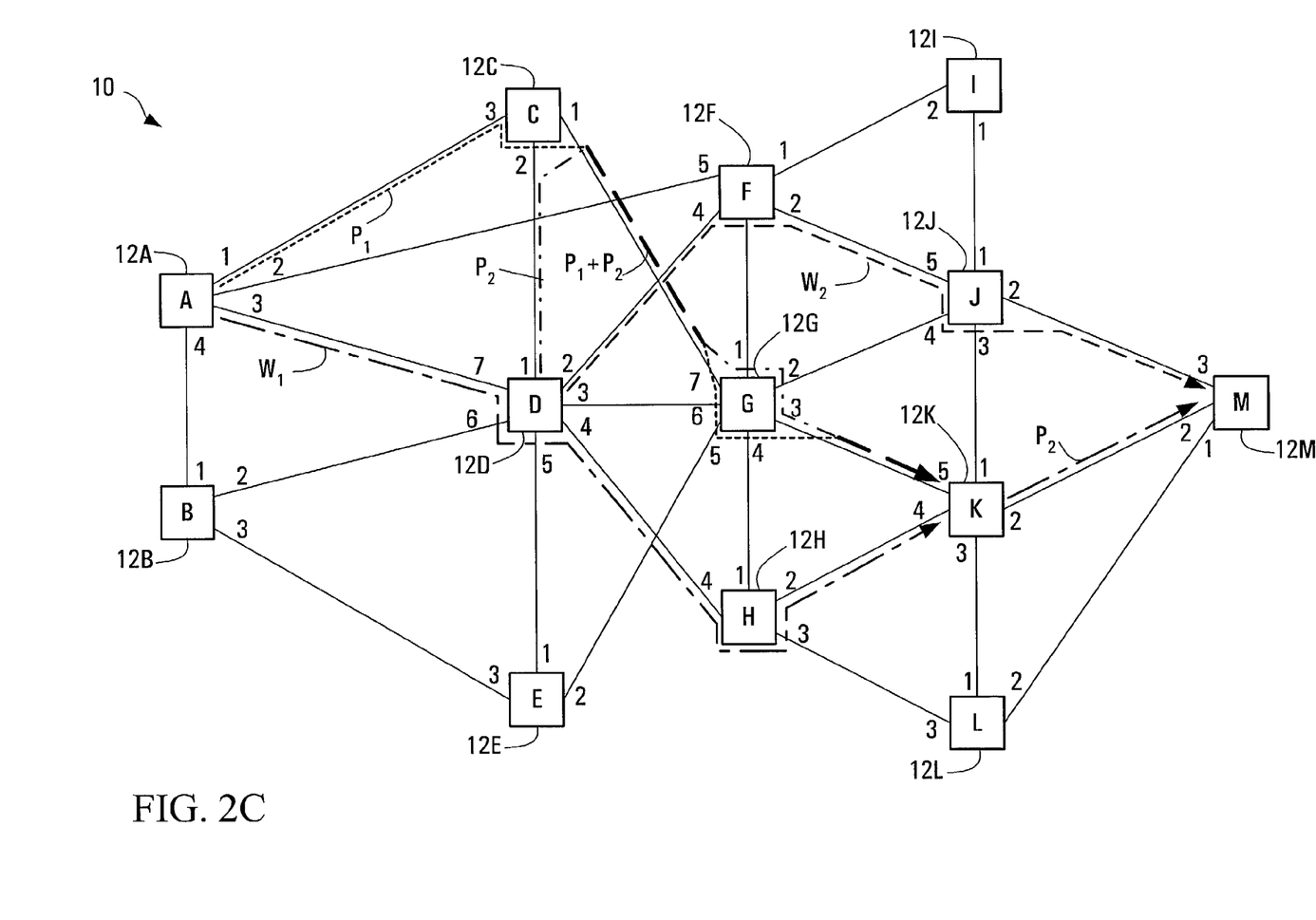
FIG. 2C illustrates working and protection paths established between nodes of the network of FIG. 1, in manners exemplary of embodiments of the present invention.

Now, additional working paths and protection paths may be established on a network already having established paths, as illustrated in FIGS. 2A-2C. FIG. 2A illustrates the network of FIG. 1, including an established working path W1 from A to K, and a corresponding protection path P1. Node D may similarly establish a second working path W2 from node D to M, in manner similar to the establishment of working path W1, as detailed above. As illustrated, a working path W2 including nodes D, F, J, and M is established. Thereafter, a protection path P2 for working path W2 may be established between nodes D and M along nodes D, C, G, K and M.

Specifically, after establishing working path W2, source node D may pre-compute a protection path to node M. For example, the path D, C, G, K, and M may be established as a protection path for the path D, F, J, M, as illustrated in FIG. 2B. As noted with reference to FIG. 1, establishment of the protection path may be effected by sending a suitable MPLS path establishment message (LDP-ER/RSVP-TE) from D to M. Once received at M, messages may be passed upstream and used to establish label based routing entries at nodes K, G, C, and D. Again, the protection path P2 may be established in a conventional so that path P2 offers 1+1 protection for path W2.

Without further processing, portions of protection path P1 and protection path P2 share common links between nodes C and G and G and K, as illustrated in FIG. 2B. As such, bandwidth on these links would be reserved for each protection channel. As the likelihood of simultaneous failure of working paths W1 and W2 is small, protection channels between nodes may be combined and paths may be shared in a manner exemplary of the present invention.

Figure 3:
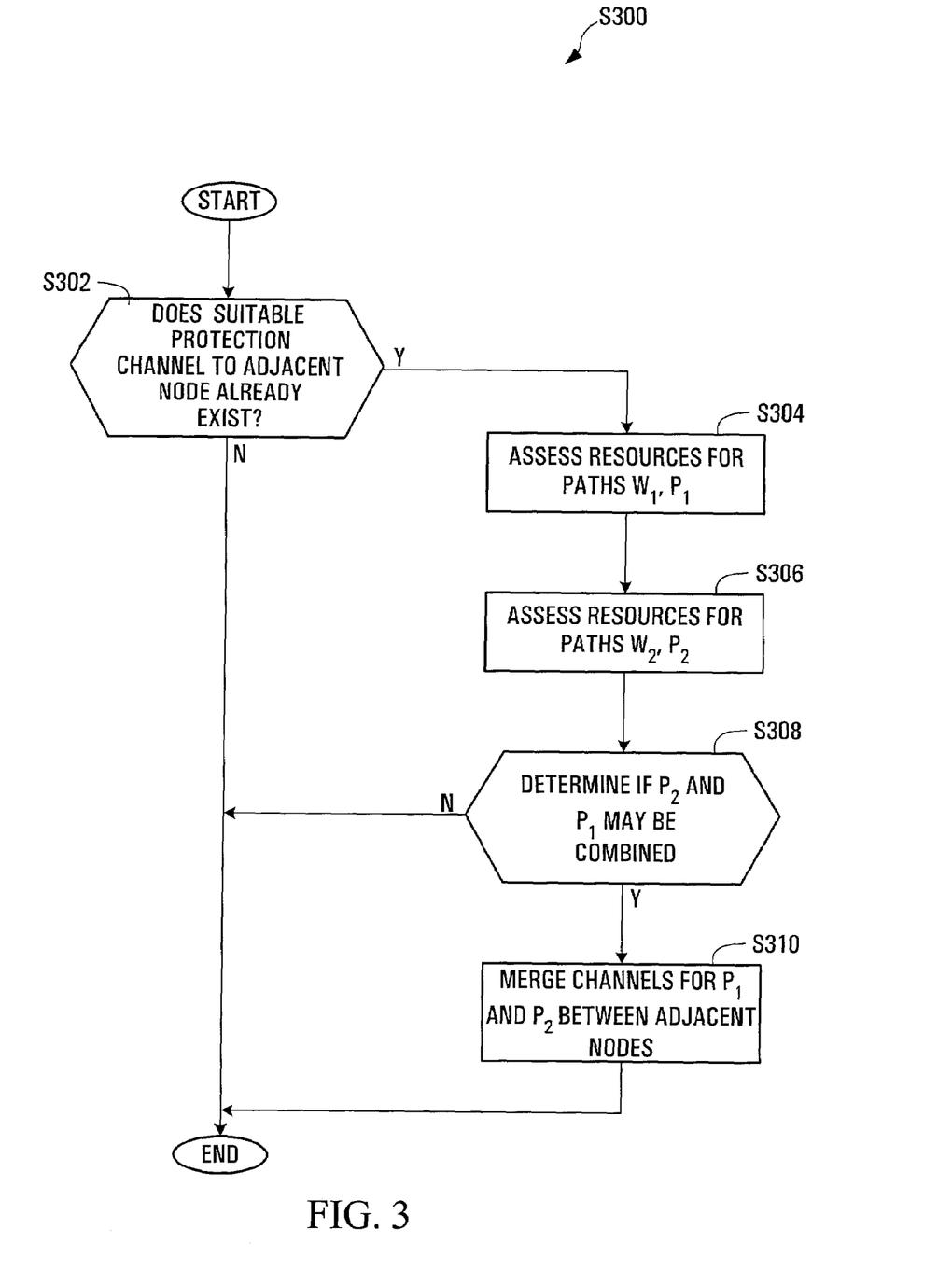
FIG. 3 illustrates steps exemplary of an embodiment of the present invention, performed at an individual node of the network of FIG. 1.

Therefore, at each node along the protection path, steps S300 illustrated in FIG. 3 may be performed. Specifically, as illustrated, upon or after establishment of a channel between nodes, forming part of a protection path each node may attempt to identify whether or not existing protection channels may be shared. This may be effected in many ways.

For, example, some time after establishing a protection channel along protection path P2 between first node G and second node K (FIGS. 2B and 2C), steps S300 may be performed at node G to assess if protection paths may be shared. Preferably, each node determines if protection paths may be shared in a downstream direction. Of course, each node could perform steps S300 for adjacent in an upstream direction, or in an up and downstream direction.

For FIGS. 2B and 2C node K is the adjacent node of interest for node G. In any event, node G may assess if a protection channel, sharing an adjacent node with the protection path P2, already exists in step S302. In order to assess if a protection channel already exists between the first and second node, the identity of the adjacent node for recently established protection path P2 may be compared to existing protection paths known at node G to assess if a protection channel to the second node already exists. This may, for example, be effected by examining stored routing information at the node identifying established protection paths at the node. So, example node G may examine locally stored routing/connection information to assess if a protection channel between node G and node K has already been established. In the example network of FIGS. 2A and 2B a protection channel to node K may be identified at node G by a routing entry at node G with port 3 as its "out" address.

If two protection channels exist between adjacent nodes exist, as determined in step S302 the node performing steps S300 may assess whether merging protection channels is proper in steps S304-S310. Specifically, node G performing steps S300 preferably assesses if merging would create a less reliable network in which protection and working paths between different source and destination node pairs are susceptible to a single point of failure across the network.

Ideally, a shared channel will not result in communication along W1 or P1 having a common point of failure with W2 or P2. A common point of failure could be created in multiple ways. For example, if W1 and W2 share a common point of failure, protection sharing is inappropriate. Similarly, if W1 and P2, or W2 and P1 share a common point of failure, merging protection paths may be inappropriate, as protection switching may result in paths between two pairs of source and destination nodes becoming susceptible to a single point of failure. That is, for the network of FIGS. 2A, 2B, and 2C, node G checks for a possible common point of failure between W2 and P1, or W1 and P2, or W1 and W2. In this way, if traffic along the two paths is carried by any combination of working (W1, W2) and protection paths (P1, P2), both paths are not susceptible to a single point of failure. As will be appreciated, if a common point of failure exists the existing protection channel may not be shared.

To make the assessment in step S308, the node performing step S300 queries the source nodes of the paths serviced by the protection channel of interest to explicitly determine if resources are shared. As such, example node G queries one or more nodes along W1 for an indicator of resources for working and protection paths W1 and P1 in step S304.

For example, MPLS as suitably extended may provide indicators of resources along paths to a querying node. For instance, a resource assessment message could be passed from node G to node A along W1 and back to node G along P1. At each node along W1 and P1, that node may append information about the resources known at the node, as for example detailed in U.S. patent application Ser. No. 09/748,391. Resources may, for example, be ports, trenches, cables, wavelengths, shared risk groups, and the like, and reflect possible points of failure along W1 or P1 known by each node along the working and protection paths, respectively. Each resource is preferably uniquely identified. An indicator of each resource could be appended to the message as it travels from G to A along W1, and from A to G along P1. Ideally, node G thus gathers identifiers of resources along W1 and P1.

In step S306, node G queries the source node of W2 (node 12d) for identifiers of risks along paths W2 and P2. Again, a resource assessment message could be passed from node G to D along W2 and from D to G along P2. Each node along P2 and W2 may append an identifier of resources known to that node along the path. Node G thus also gathers identifiers of resources along W2 and P2.

Alternatively, resources for each node may be assessed as working and/or protection paths are established. Identifiers of resources along the path may be passed to the source node for a working or protection path, as for example detailed in U.S. patent application Ser. No. 09/748,391 or distributed to one or more nodes. In this way, each node need not send a resource assessment message along working and protection paths when performing steps S300. Instead, the source node (or some other node) could be queried for identifiers of resources along working and protection paths. Alternatively, the resources could be known at node G, so that no additional querying is necessary.

In any event, once indicators of resources each path W1, W2, P1 and P2 are assessed at G, G may compare these in order to determine whether or not W1, W2, P1 and P2 share any common risks. Optionally, assessed resources for each path may be stored at G. Thus, in step S308, node G compares working and protection paths W1, P1; W2, P2 to ensure no common resources (i.e. common points of failure) along the paths.

If no common points of failure exist as determined in step S308, the protection channel along P1 between the first node performing steps S300 and the adjacent second node (i.e. nodes G and K) may be shared. As such, in step S310, path information at node G may be updated to reflect that the protection channels between node G and adjacent node K are shared. For example, depending on the networking protocols used at nodes G and K, routing tables may be updated, cross-connects may be re-configured; or SONET nodes may re-configured so that the protection channels along P1 and P2 between nodes G and K are one and the same. As well, the recently established protection channel along P2 may be released. In this way, bandwidth used by protection paths P1 and P2 between nodes G and K may be shared.

Optionally, the node performing step S300 may further determine how many protection paths share a particular already established protection channel in step S302. If the number of protection paths exceeds a defined threshold, say N, a newly created protection channel need not be merged with an existing channel. So, possibly multiple protection channels may extend between two adjacent nodes. Each protection channel, protecting up to N working paths. Any time an additional protection channel is created on the same link, it may be merged with an existing channel that protects less than N working paths.

Steps S300 may separately be performed at nodes K, G, C and A. As a result protection channels and bandwidth along paths P1 and P2 are combined on links between nodes C and G and G and K, as illustrated in FIG. 2C.

Once additional protection paths including any of nodes K, G, C, and A are formed each node may used existing knowledge of resources associated with channels, in combining protection paths. So, for example, after merger of protection paths G and K, in FIG. 3 an additional protection path between G and K may be merged using knowledge of the resources protected by, and used by the protection paths of which any existing protection channel between G and K is a part.

Conveniently, as protection channels and thus protection paths are combined, between adjacent nodes, network protection bandwidth is effectively shared. Multiple protection paths between identical nodes are not unnecessarily maintained. In the described embodiment, steps S300 are performed to combine existing protection paths. Of course, in an alternate embodiment, sharing of protection paths could be assessed before channels on links between nodes are established. Only in the event a protection channel that may be shared does not exist between nodes, would a new protection channel between adjacent nodes need to be established. Again, this may be performed in a conventional manner, using for example MPLS RSVP-TE between the adjacent nodes. Connection information at the local node may be updated to include the newly established protection channel as part of the protection path.

As should now be appreciated, steps S300 allow the establishment of a 1:n protection channels between adjacent nodes in a mesh network. Conveniently, although channels between nodes may provide for 1:n protection switching, n need not be constant for each link along the path. As well, each node may further limit n to some arbitrary number N, so that multiple protection channels each protecting up to N working paths may be established between adjacent nodes. In the event of failure of a working path, any protection path containing the channel may be used in a conventional manner. Advantageously, fault along a single one of the working paths protected by such a channel allows an established protection path to take its place. Switching between protection and working paths may be effected using known protocols. Of course, multiple failures on two paths or more working paths protected by shared protection channel may not be protected.

As should now also be appreciated, exemplary software at each node ensures protection bandwidth is effectively used, and that, where possible, protection paths between nodes are shared. Beneficially, this may be done automatically, making superior use of available network resources. Moreover, a network need not be formed exclusively with nodes embodying the present invention. Instead, only a subset of nodes on a network may embody software exemplary of the present invention. Of course, protection bandwidth will only effectively be shared between these nodes embodying the exemplary software and adjacent nodes.

As should now be appreciated, although an embodiment of the invention has been described in the context of an MPLS compliant network, the invention may be as easily implemented in another network allowing for the automated establishment of working and protection paths. For example, software exemplary of the present invention could be formed in nodes for which working and protection paths are initially configured manually by an operator. Steps S300 and onward could thereafter be automatically performed at each node so that protection channels between adjacent nodes may be merged, as described above.

All documents referred to herein are hereby incorporated by reference herein for all purposes.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A method of combining protection paths on a mesh network, the method comprising the steps of:
    defining a first protection path between a first source node and a first destination node via at least one intermediate node;
    reserving bandwidth on first links along the first protection path that extends from the first source node, through the intermediate node, and ending at the first destination node, to form first channels on the first links between the nodes along the first protection path, wherein each of the first channels comprises a first reserved bandwidth on a particular link between a pair of first nodes on the first protection path;
    defining a second protection path between a second source node and a second destination node via at least one of the intermediate nodes of the first protection path;
    assessing, by one of the intermediate nodes shared by the first protection path and a second protection path, if it is proper for the second channel on the second protection path to use the reserved bandwidth allocated to the first channel associated with the first protection path; and
    allocating the first reserved bandwidth associated with the first protection path to both the first protection path and second protection path if it is determined during the step of assessing that the second channel on the second protection path can use the reserved bandwidth allocated to the first channel associated with the first protection path.

2. The method of claim 1, further comprising determining if a first working path protected by said first protection path and a second working path protected by said second protection path share common resources to determine if it is proper to for the second channel to use the reserved bandwidth allocated to the first channel.

3. The method of claim 1, further comprising determining if said second channel has already been shared along a defined number of other protection paths, to determine if it is proper to for the second channel to use the reserved bandwidth allocated to the first channel.

4. The method of claim 1, further comprising comparing resources along said first protection path to resources along said second protection path to determine if it is proper to for the second channel to use the reserved bandwidth allocated to the first channel.

5. The method of claim 4, further comprising querying a source of a first working path associated with the first protection path, to obtain an indicator of resources for said first working path.

6. The method of claim 5, further comprising querying a source of a second working path associated with the second protection path to obtain an indicator of resources for said second working path.

7. The method of claim 4, further comprising querying nodes along a first working path associated with the first protection path, to obtain an indicator of resources for said first working path.

8. The method of claim 5, further comprising querying nodes along a second working path associated with the second protection path to obtain an indicator of resources for said second working path.

9. The method of claim 6, further comprising assessing if said first working path share one or more common points of failure with said second protection path.

10. The method of claim 6, further comprising assessing if said second working path shares a common point of failure with said first protection path.

11. The method of claim 1, further comprising determining if said first channel is already shared by a defined number of additional protection paths to determine if it is proper to for the second channel to use the reserved bandwidth allocated to the first channel.

12. The method of claim 1, further comprising reserving bandwidth other than the reserved bandwidth allocated to the first channel, for the second channel, if it is determined during the step of assessing that the second channel on the second protection path can not use the reserved bandwidth allocated to the first channel associated with the first protection path.

* * * * *